Feb. 25, 1930.  J. S. WILLMAN  1,748,814
AUTOMATIC FENDER FOR VEHICLES
Filed Sept. 20, 1928
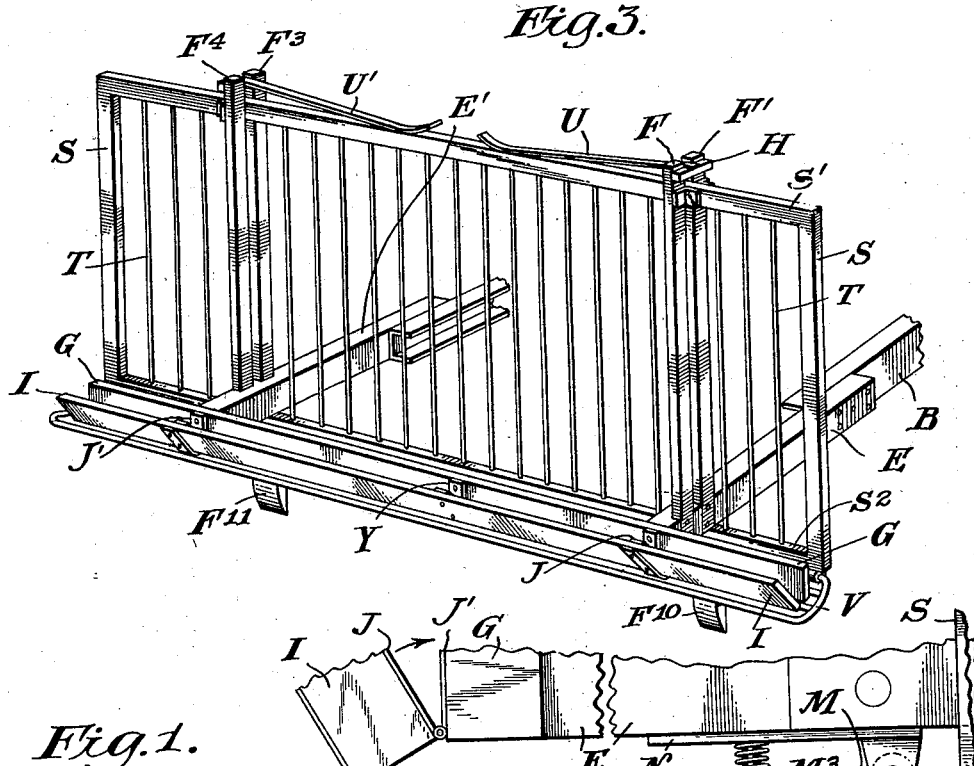
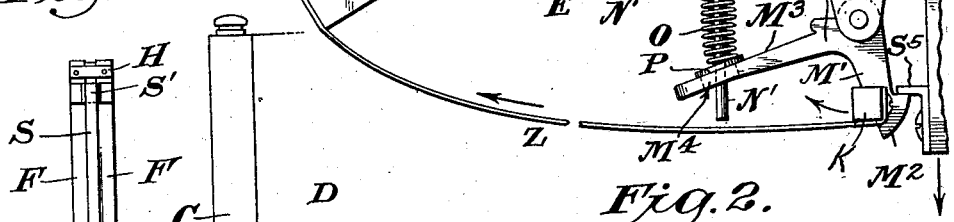
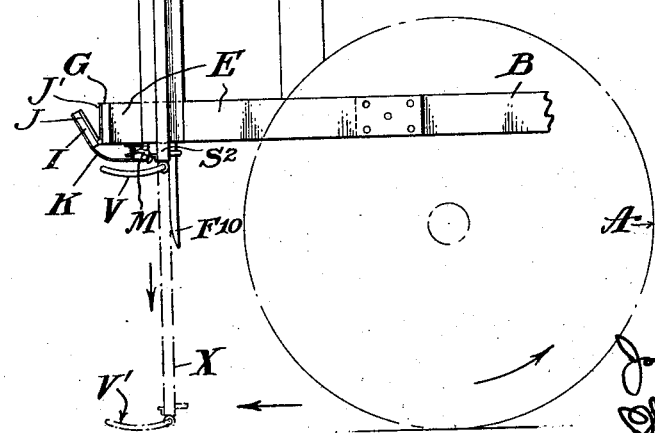
INVENTOR
Joseph S. Willman
BY
ATTORNEY Patented Feb. 25, 1930

1,748,814

UNITED STATES PATENT OFFICE

JOSEPH SYLVESTER WILLMAN, OF BROOKLYN, NEW YORK

AUTOMATIC FENDER FOR VEHICLES

Application filed September 20, 1928. Serial No. 307,143.

This invention relates to fenders for use upon vehicles, and the improvements reside in the provision of means for automatically operating the same.

While my improvements may be applied to all kinds of vehicles, I have shown in the accompanying drawings the combination of such improvements with an automobile, in this instance being located at the forward end thereof.

One object of my invention is to provide an automatically operating fender for a vehicle to prevent the wheels of such vehicle passing over a person or an object struck by the vehicle.

Another object of my invention is to provide such a fender with a scoop or a like device carried at or near the lower end of the fender.

A third object of my invention is to provide a fender of the kind mentioned which may be readily attached to the forward end of an automobile, preferably forward of the radiator of an automobile.

A fourth object of my invention is to provide a tripping device adjacent to and forward of the fender, and which may be used as a substitute for a bumper.

A fifth object of my invention is to provide a novel form of catch which is employed for releasably securing the fender in raised position.

Other objects of my invention will be mentioned hereinafter, and set forth in the appended claims.

Referring to the particular embodiment of my invention illustrated in the accompanying drawings, Fig. 1 is a left-hand side view of the forward end of an automobile together with one form of my fender and the means for releasably holding the same in position;

Fig. 2 is an enlarged view of the latching and releasing devices;

Fig. 3 is a perspective front view of the arrangement of Fig. 1.

For the sake of clearness, the only parts illustrated of the automobile are a wheel, A, a main-bar B, a radiator-frame C, and hood D.

As illustrated, the fender and the parts for automatically latching and automatically releasing the same, are located forwardly of the radiator of the automobile, being above and carried by bars E and $E^1$, which are secured to and project forwardly from the main bars B of the car.

Near the forward ends thereof, the bars E and $E^1$ are provided with fender-guides. These, as shown, may consist of posts or the like arranged in spaced-apart pairs, F—$F^1$, and $F^2$—$F^3$, these posts projecting upwardly and connected in their spaced relation at their upper ends by blocks, such as H. As shown in Fig. 1, the fender-guides are held rigidly by the short bars E and $E^1$, a considerable distance in advance of the radiator of the automobile. The rearward bar (that is $F^1$, or $F^3$) of a pair of fender-guides, carries or is continued as a downwardly extending brace-bar, $F^{10}$, the lower end whereof is tapered.

At their forward ends, the bars E and $E^1$, fixedly carry a plate G or the like. This plate is used as a means for articulately connecting a trip-bar, or trip-plate I, or other tripping means, to the supporting structure. It may, therefore, be of any width, shape or size desired, or may even be omitted, in which latter case the articulate connections may be secured to the forward ends of the bars E and $E^1$. The connections which I prefer to employ are hinges of any suitable kind. As shown, I may use hinges, such as J and $J^1$, and also any desired additional hinges, such as Y.

The tripping means, indicated at I, may be a plate, the lower edge of which is connected at a plurality of points to the fixed plate G by means of the hinges before spoken of (J, $J^1$ and Y).

Normally, the upper edge of the tripping plate I is projected slightly forward and at an angle of, say, 30° with relation to the fixed plate G. The tripping plate is rearwardly movable until it comes in contact with G.

By means of a connection, hereinafter described, the tripping plate controls the unlatching of a fender, and is restored to its operative (forward) position by operation of the unlatching device.

The last-mentioned device comprises a crosswise bar K located below and at right angles with respect of the two bars E and E¹. It is movably connected with the tripping plate I, by means of a strap or strip Z, or a plurality of such straps or strips may be used for that purpose.

The bar K is connected with and operates mechanism for unlatching the fender. The mentioned mechanism may include any desired or suitable number of unlatching devices. For this purpose, I prefer to employ a novel form of elbow catch of my invention, said catches being used one immediately underneath bar E and the other immediately underneath bar E¹.

Such novel form of catch consists of a movable member M and a fixed base member N, the latter being secured directly underneath a bar (E or E¹) and having a somewhat long pin N¹ extending downwardly from the plate of the fixed member N.

The movable member M has an arm M¹ which is provided with a shouldered portion, M², and such arm M¹ is connected with the bar K before spoken of, it being understood that such bar is suitably connected with any other catch or catches employed for unlatching.

The other arm (that shown at M³) of the catch has an opening M⁴, therein, and through which the elongated pin N¹ projects. A spring O surrounds said pin and bears against the plate N aforesaid, and also against a washer P, which latter fits over the opening M⁴ in the arm M³.

An elbow catch of the novel form shown is not only exceedingly rugged and capable of withstanding the rough usage to which it is likely to be subjected during the operation of an automobile, but is also extremely sensitive and easily responsive to the pull exerted thereon by a strap or strip Z.

An examination of the illustrations of the unlatching mechanisms already described, will show that upon the upper (free) edge of the tripping plate I coming into contact with a person or object, said plate will swing rearwardly about its hinges until it comes against the fixed plate G. By reason of the strap or strip Z being secured to the swinging tripping plate I, the bar K will be pulled forwardly and the elbow catch will be pulled about its pivot putting the spring O under increased strain.

It will be understood, of course, that the tripping plate I may be connected by any desired number of straps or strips Z, with the bar K, and that any desired number of elbow catches may be provided and be secured to said bar K.

As before stated, the spring O of the novel form of elbow catch has its compression increased upon the operation of the tripping plate I. It follows, therefore, that upon the said tripping plate being released, the spring O will return the movable member M, the bar K, the strap Z, and the plate I to their original positions (those illustrated) ready for another operation.

As hereinbefore stated, the bars E and E¹ carry upwardly-extending fender guides disposed in pairs F—F¹, and F²—F³. These pairs of bars are used to hold a fender S, while in its upper position (being that illustrated in full lines in Fig. 1 and that shown in Fig. 3).

A form of fender which may be used consists of an open frame, the width of which preferably equals (about) the width of the forward bumper carried by an automobile, being greater than the distance between the outer edges of the two front wheels of the car.

The form of fender shown in the accompanying drawings, consists of an open frame with rods or strong wires T running from a top bar S¹ to the lower bar S². The frame is, as before stated, fitted between the pairs (F—F¹, and F²—F³) of fender-guides, and may be moved between these guides either from upper to lower (effective) position, or from the lower to upper (ready) position. It will be noted that the relation of the parts is such that the upper bar S¹ of the frame will come against the upper sides of the extension-bars E and E¹; this arrangement prevents separation of the fender-frame from the fixed parts of the device.

The fender frame carries one or more angles S⁵ (Fig. 2) which are capable, in the raised position of the fender frame, of engaging with and being releasably held by the shoulders M² of the novel elbow catches.

U and U¹ are long flat springs, each connected at one end with a part H which also spaces the guide bars apart, while the other, free, ends of the springs press against the upper bar S¹ of the fender frame.

V is a scoop device connected with the lower end of the fender frame, or with the lower bar, S², thereof. Such scoop device is preferably composed of flexible or yielding parts and extends forwardly or in a direction away from the wheels of the vehicles.

From all of the foregoing, it is obvious that upon the tripping plate I striking against a person or an object, the elbow catch (or elbow catches) will be operated to have the shoulder M² release the angle S⁵, whereupon the springs U and U¹ will throw the scoop at the end of the fender frame to a position where such scoop strikes the ground in front of the wheels of the car.

To restore the parts, it is merely necessary to raise the fender frame until the angle S⁵ passes and is engaged by the shoulder M².

If desired, a bumper may be used in addition to the fender. It will be noted, however, that the tripping plate I may be used in place of a bumper.

While I have herein described and illustrated one embodiment of my improvements, it will be understood that I do not confine myself to such embodiment or to the details described or illustrated. Obviously, my improvements may be embodied in other forms which will suggest themselves to persons skilled in fender construction or in automobile construction, and still be within the scope of my claims.

What I claim is:

1. As a new article of manufacture, an elbow catch comprising a base member, a long pin carried by said base member, a member pivotally carried by the base member and having an arm engaged by the pin aforesaid, and a spring surrounding said pin and bearing against both members of the catch.

2. In combination with a vehicle, a fixed frame, a tripping-plate carried by said frame, a catch also carried by the frame, a strap connecting the tripping-plate with the catch, and a fender also carried by said frame and normally and releasably held in inoperative position by said catch.

3. In combination with a vehicle, a fixed frame, a tripping-plate carried by said frame, a catch also carried by the frame, a strap connecting the tripping-plate with the catch, and a movable fender carried by the frame and provided with an angle for engagement by the catch.

4. In combination with a vehicle, a fixed frame, tripping means and a catch operable thereby both carried by the frame, and a movable fender also carried by the frame and provided with an angle for engagement by the catch.

Signed at borough of Brooklyn in the county of Kings and State of New York this seventh day of September A. D. 1928.

JOSEPH SYLVESTER WILLMAN.